United States Patent Office 2,731,467
Patented Jan. 17, 1956

2,731,467

ESTERS OF HETEROCYCLIC ACIDS AND 1,2,3,4-TETRAHYDROISOQUINOLINE-2-ALKANOLS

John W. Cusic, Skokie, Ill., assignor to G. D. Searle & Co., Chicago, Ill., a corporation of Illinois No Drawing. Application February 19, 1954, Serial No. 411,545

9 Claims. (Cl. 260—287)

My invention relates to a new group of esters of heterocyclic acids and 1,2,3,4-tetrahydroisoquinoline-2-alkanols, their derivatives and salts, and to methods for their synthesis. The compounds which constitute my invention can be represented as the bases of the structural formula

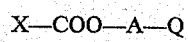

X—COO—A—Q and their salts, wherein X is a monocyclic heterocycle such as furan, thiophene, and pyridine, A is a lower alkylene radical and Q is a 2-(1,2,3,4-tetrahydro)isoquinoline radical which may be substituted at the carbon atoms of the nitrogen-containing ring by a lower alkyl radical. In the foregoing structural formula, the radical A is a lower alkylene radical which is derived from a divalent, straight-chained or branched-chained hydrocarbon radical as ethylene, propylene, butylene, amylene, hexylene, or polymethylene radicals such as trimethylene, tetramethylene, pentamethylene, and hexamethylene. The radical Q is a 2-(1,2,3,4-tetrahydroisoquinoline) radical attached to the alkylene radical in the formula above at the nitrogen atom; this tetrahydroisoquinoline radical can be further substituted, preferably in the py-ring, by a lower alkyl radical such as methyl, ethyl, straight and branched chain propyl, butyl, amyl, and hexyl.

The organic bases described herein form pharmaceutically acceptable salts which are non-toxic in therapeutic dosage with a variety of inorganic and strong organic acids, including sulfuric, phosphoric, hydrochloric, hydrobromic, hydroiodic, sulfamic, citric, lactic, maleic, nicotinic, malic, succinic, tartaric, cinnamic, acetic, benzoic, gluconic, ascorbic, and related acids. They also form quaternary ammonium salts with a variety of organic esters of sulfuric, hydrohalic and aromatic sulfonic acids. Among such esters are methyl chloride, bromide and iodide; ethyl chloride, propyl chloride, butyl bromide, isobutyl chloride, benzyl chloride, phenethyl chloride, naphthylmethyl chloride, dimethyl sulfate, methyl benzenesulfonate, ethyl toluenesulfonate, ethylene chlorohydrin, propylene chlorohydrin, allyl chloride, methallyl bromide and crotyl bromide.

The 1,2,3,4-tetrahydroisoquinoline derivatives of my invention and their salts are of value as intermediates in organic synthesis and as pharmaceutical agents, particularly because of their regulatory effect on the heart and their effect in improving circulation, particularly by peripheral vasodilation.

My invention will appear more fully from the following examples which are set forth for the purpose of illustration only, but are in no way to be construed as limiting it in spirit or in scope. In these examples temperatures are given uncorrected in degrees centigrade (° C.), pressures during vacuum distillation in millimeters (mm.) of mercury, and quantities of materials in parts by weight.

Example 1

On mixing of 130 parts of 2-furoyl chloride and 177 parts of 1,2,3,4-tetrahydroisoquinoline-2-ethanol in 1200 parts of butanone, a solid precipitate forms. The reaction mixture is refluxed for 3 hours and then permitted to stand for 12 hours. The crystalline precipitate is collected on a filter and recrystallized from dilute isopropanol. The hydrochloride of 2-[β-(2'-furoyloxy)ethyl]-1,2,3,4-tetrahydroisoquinoline thus obtained melts at about 188–189° C. It has the structural formula

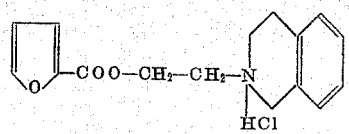

Example 2

On mixing of 146 parts of 2-thiophenecarbonyl chloride, 177 parts of 1,2,3,4-tetrahydroisoquinoline-2-ethanol and 1600 parts of butanone, a solid precipitate forms. After refluxing for 3 hours, the mixture is cooled, and the solid precipitate is collected on a filter and recrystallized from dilute isopropanol. There is thus obtained the hydrochloride of 2-[β-(2'-thiophenecarboxy)ethyl]-1,2,3,4-tetrahydroisoquinoline which melts at about 185–186° C. It has the structural formula

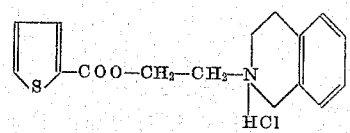

Example 3

A mixture of 356 parts of the hydrochloride of nicotinyl chloride, 354 parts of 1,2,3,4-tetrahydroisoquinoline-2-ethanol, 169 parts of pyridine and 1200 parts of butanone is refluxed for 5 hours after which the solvents are removed by vacuum distillation. The reaction mixture is rendered alkaline by addition of dilute sodium hydroxide and extracted with ether. This ether extract is dried over anhydrous potassium carbonate, filtered and evaporated to yield an oily residue which is distilled at 1 mm. pressure. 2-(β-nicotinyloxyethyl)-1,2,3,4-tetrahydroisoquinoline is collected at about 190–192° C. This oily material is dissolved in a small amount of 2-propanol and then added to an excess of anhydrous isopropanolic hydrogen chloride. Upon cooling, the solid dihydrochloride precipitates which melts at about 197–198° C. This salt has the structural formula

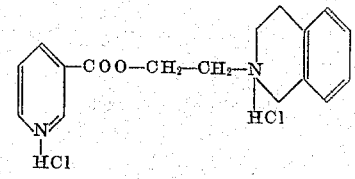

Substitution of 356 parts of the hydrochloride of isonicotinyl chloride for the hydrochloride of nicotinyl chloride in the process above yields the 2-(β-isonicotinyloxyethyl)-1,2,3,4-tetrahydroisoquinoline which is distilled at about 190–200° C. and 1 to 1.5 mm. pressure. It has the structural formula

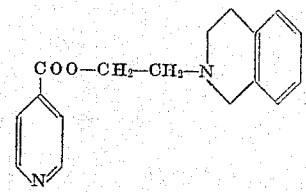

Similarly, substitution of an equal amount of the hydrochloride of picolinyl chloride for that of nicotinyl chloride yields the 2-(β-picolinyloxyethyl)-1,2,3,4-tetrahydroisoquinoline which is distilled at about 160–170° C. and 0.2–0.25 mm. pressure. It has the structural formula

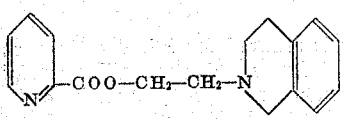

Example 4

A mixture of 178 parts of the hydrochloride of isonicotinyl chloride, 205 parts of 3-methyl-1,2,3,4-tetrahydroisoquinoline-2-propanol, 85 parts of pyridine and 700 parts of butanone is refluxed for 5 hours and then freed from solvents by vacuum distillation. The residue is rendered alkaline by addition of dilute sodium hydroxide and extracted with ether. The resulting extract is dried over anhydrous magnesium sulfate, filtered and evaporated. 2-(γ-isonicotinyloxypropyl)-3-methyl-1,2,3,4-tetrahydroisoquinoline is collected on vacuum distillation at about 1 mm. pressure and 200–210° C. The compound has the structural formula

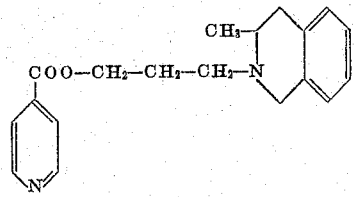

Example 5

O-carboethoxymandelic acid is prepared by the process of E. Fischer and H. O. L. Fischer (Berichte deut. Chem. Ges., 46, 2659; 1913). 118 parts of this acid are dissolved in 175 parts of benzene and 126 parts of thionyl chloride are gradually added. The mixture is refluxed for 2 hours, permitted to stand at room temperature for 5 hours and then concentrated in vacuo. The O-carboethoxymandelic acid chloride is collected on vacuum distillation at about 155–158° C. and 13 mm. pressure.

A mixture of 15 parts of O-carboethoxymandelic acid chloride, 10 parts of 1,2,3,4-tetrahydroisoquinoline-2-ethanol and 80 parts of butanone is heated at reflux temperature for 2 hours and then cooled. Upon treatment with ether an oil separates which gradually solidifies. This precipitate is collected on a filter, dissolved in a mixture of butanone and isopropanol and cooled. The hydrochloride of 2-[β-(O-carboethoxymandelyloxy)-ethyl]-1,2,3,4-tetrahydroisoquinoline thus obtained melts at about 157–158° C.

I claim:
1. A 1,2,3,4-tetrahydroisoquinoline derivative of the structural formula

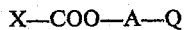

wherein X is a member of the class consisting of 2-furyl, 2-thienyl and pyridyl radicals, A is a lower alkylene radical and Q is a 2-(1,2,3,4-tetrahydro)isoquinoline radical containing attached to the carbon atoms of the nitrogen-containing ring members of the class consisting of hydrogen and lower alkyl radicals.

2. A 1,2,3,4-tetrahydroisoquinoline derivative of the structural formula

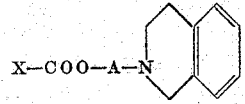

wherein X is a 2-furyl radical and A is a lower alkylene radical.

3. 2-[β-(2'-furoyloxy)ethyl]-1,2,3,4-tetrahydroisoquinoline.

4. A 1,2,3,4-tetrahydroisoquinoline derivative of the structural formula

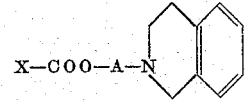

wherein X is a 2-thienyl radical and A is a lower alkylene radical.

5. 2-[β-(2'-thiophenecarboxy)ethyl]-1,2,3,4-tetrahydroisoquinoline.

6. A 1,2,3,4-tetrahydroisoquinoline derivative of the structural formula

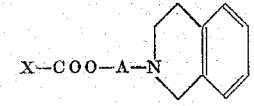

wherein X is a pyridyl radical and A is a lower alkylene radical.

7. 2-(β-nicotinyloxyethyl)-1,2,3,4-tetrahydroisoquinoline.

8. 2-(β-isonicotinyloxyethyl)-1,2,3,4-tetrahydroisoquinoline.

9. 2-(β-picolinyloxyethyl)-1,2,3,4-tetrahydroisoquinoline.

References Cited in the file of this patent
UNITED STATES PATENTS
2,681,911   Cusic _____ June 22, 1954